B. F. Mayhew.
Shingle Mach.
Nº 91,952. Patented Jun. 29, 1869.
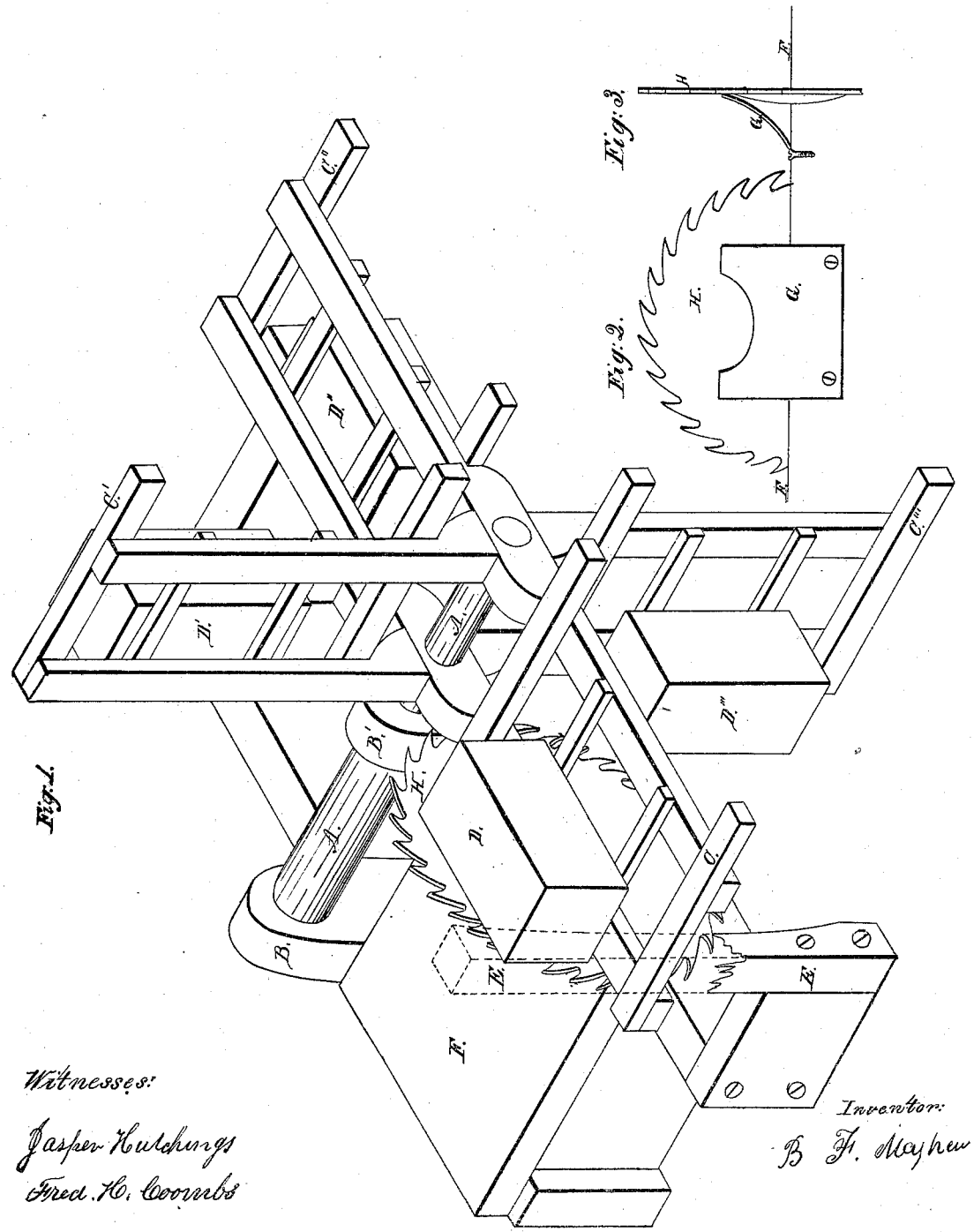
Witnesses:
Jasper Hutchings
Fred. H. Coombs
Inventor:
B. F. Mayhew

United States Patent Office.

BENJAMIN FRANKLIN MAYHEW, OF CARMEL, MAINE.

Letters Patent No. 91,952, dated June 29, 1869.

IMPROVEMENT IN SHINGLE-MACHINE.

The Schedule referred to in these Letters Patent and making part of the same.

*To all whom it may concern:*

Be it known that I, BENJAMIN FRANKLIN MAYHEW, of Carmel, in the county of Penobscot, and State of Maine, have invented a new and useful Improvement in Bolt-Carriages for Shingle-Machines; and I do hereby declare that the following is a full, clear, and exact description thereof, which will enable others skilled in the art to make and use my invention, reference being had to the accompanying drawings, and to the letters of reference marked thereon, of which said drawings—

Figure 1 is a perspective view of my invention.
Figure 2 is a view of the saw and stationary collar.
Figure 3, a sectional view of the same.

I will now proceed to describe the construction and operation of my invention.

I construct the shaft A, and place the same in the bearing-boxes B B'.

I gear the shaft A to rotate from right to left, whilst the saw H revolves from left to right, as shown in fig. 1.

I construct four carriages, C C' C'' C''', (or a greater or less number,) and secure the same radially to the shaft A. I then provide each carriage with the ordinary "set-works" (not necessary to be here shown or described) of a shingle bolt-carriage.

I construct the standard E, and affix the same to the table F, in such position that a series of levers (one of which is attached to the set-works on each carriage) may consecutively engage with the standard E, and actuate the set-works to which they are attached.

I construct the stationary collar or deflector G, to act in conjunction with the ordinary saw-collar, and attach the same to the table F, as shown in figs. 2 and 3.

In operation, (the various parts being then in the position shown in fig. 1,) the shaft is put in motion. The carriage C passes below the saw, and the carriage C' approaches the saw from above.

When the end of the carriage C' is opposite the top of the standard E, the lever of the set-works engages with the head of the standard, and the bolt D' is set over in the set-works in the ordinary manner.

The bolt D' then reaches the saw, and, as the shingle is sawed from the bolt, the shingle is "thrown off" or deflected from the saw by the saw-collar and stationary collar G, and rests upon the table F until severed from the bolt.

By this deflection, also, the saw is made to operate more freely, by reason of the constant spreading of the shingle away from the bolt.

The motion of the shaft being continued, the bolts are consecutively set over, and then brought to the saw, and the shingles sawed from the bolts.

As shown in the drawings, the longest diameter of the bolt is presented to the action of the saw, and the bolt is carried completely across the face of the saw.

There are special advantages incident to my arrangement of the bolt-carriages, among which may be named the following:

Great economy in room is attained, as compared with those machines whose table or bed, whether revolving or not, is in a horizontal plane. The bolts are easily handled; they are always in full view, and the face of each shingle as sawed can at all times be seen by the operator, who can thus discover whether it is necessary to change the position of any, and which bolt. The shingles, instead of dropping to the floor, as from a horizontal saw and carriage, or resting upon or being thrown about by the saw, drop regularly upon a table at a convenient height and place for jointing, without any extra handling or removal. The saw-dust also, readily clears itself, by dropping to the floor; and the bark, also, as loosened, falls out of the way, instead of remaining on the table, as in a horizontal machine. There is no tendency of the saw-dust to be carried by friction between the saw and the bolt, and thus wedge down the saw and produce uneven sawing. The vertical saw is more easily filed and set without removal from its shaft. There is less liability of collections of debris around the vital and most inaccessible parts of the machinery, because the shaft runs high above the floor, and the saw-dust, bark, and waste, readily fall away from it. The bearings and boxes, also, are more accessible for oiling, and there is less waste and running away of the oil than in a horizontal machine with vertical shafts. Also, a much more simple and effectual set-works may be used in my arrangement of the shafts.

I am aware that a table revolving in a horizontal plane, and having a series of apertures with devices for holding the blocks therein, has been used. This I do not claim; but

I claim the arrangement of the series of shingle-bolt carriages upon the sides of the radial arms projecting from the horizontal revolving shaft, all the parts being constructed, arranged, and operating, substantially as and for the purposes set forth.

BENJAMIN FRANKLIN MAYHEW.

Witnesses:
H. P. BLOOD,
FRED. H. COOMBS.